(No Model.) 3 Sheets—Sheet 2.
R. PORTER.
BEE ESCAPE.
No. 489,754. Patented Jan. 10, 1893.
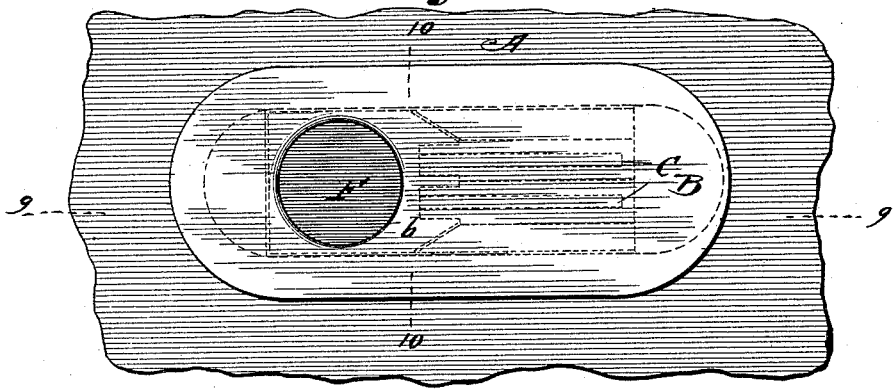
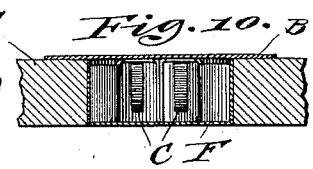

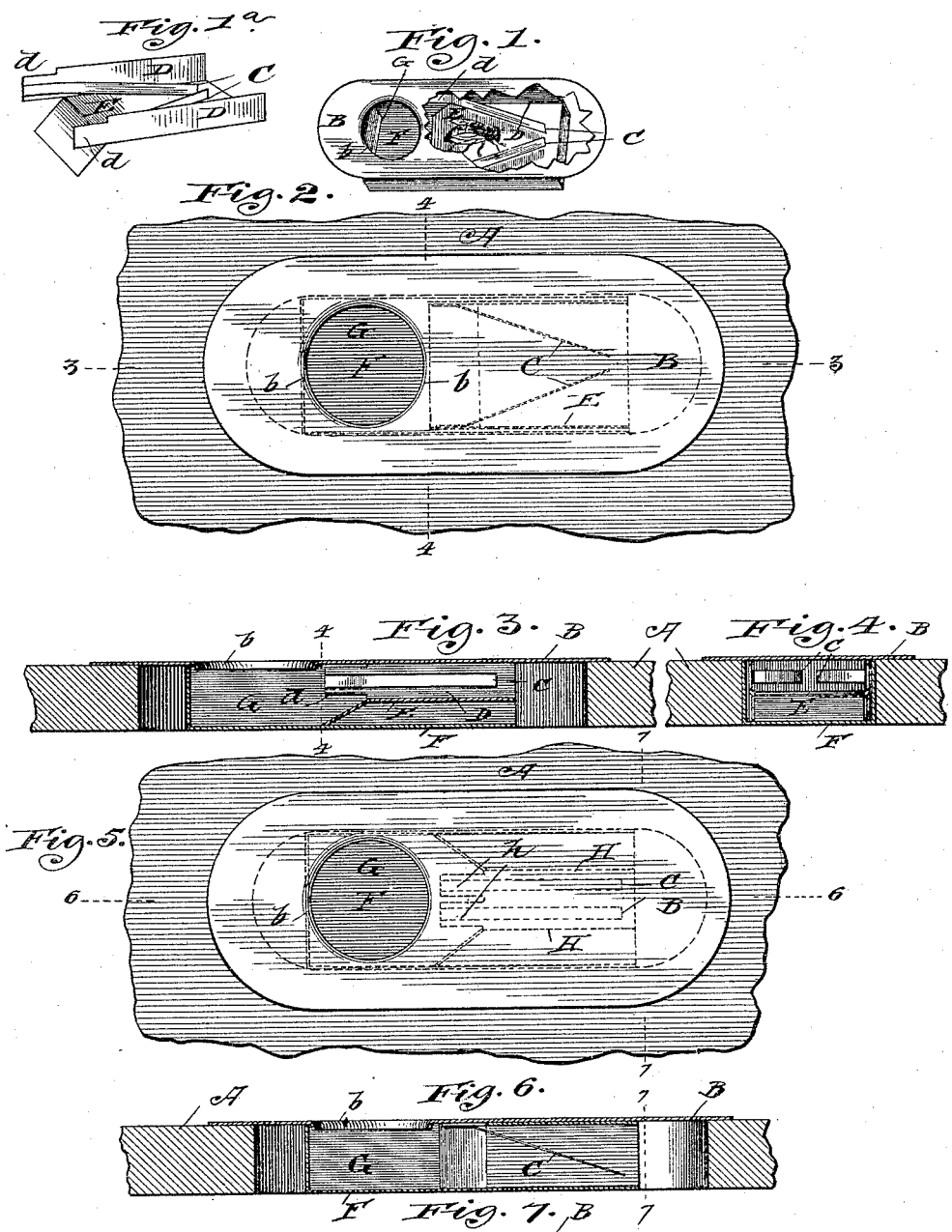

(No Model.) 3 Sheets—Sheet 3.
R. PORTER.
BEE ESCAPE.
No. 489,754. Patented Jan. 10, 1893.
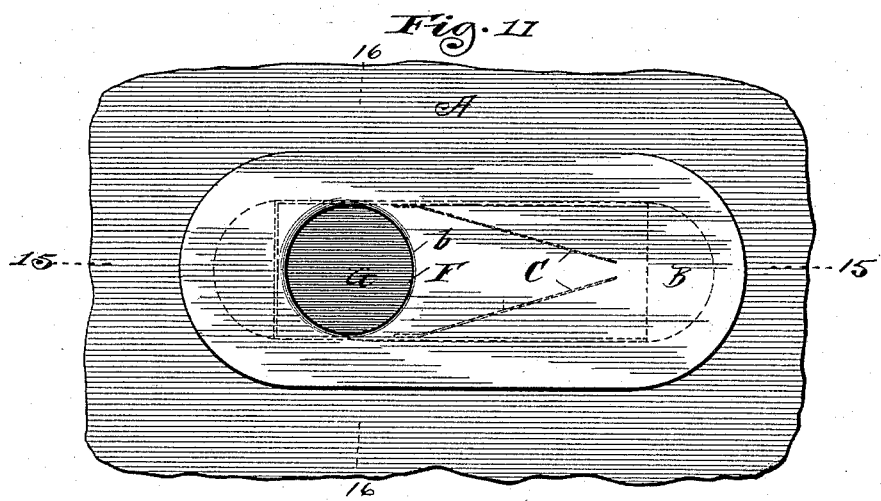
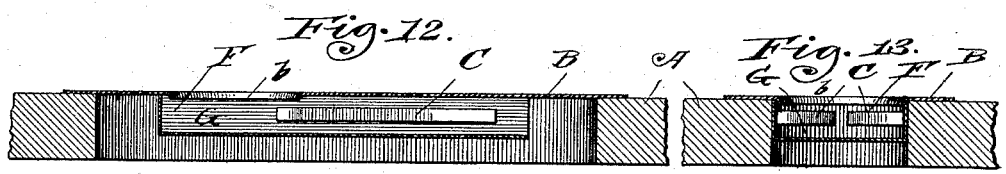
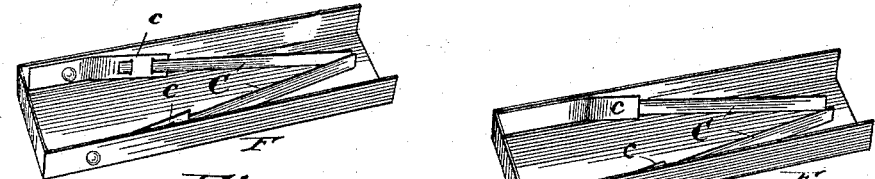
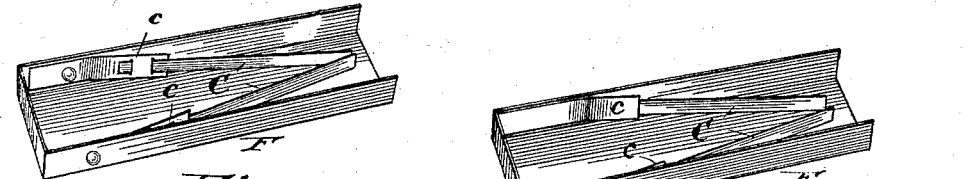
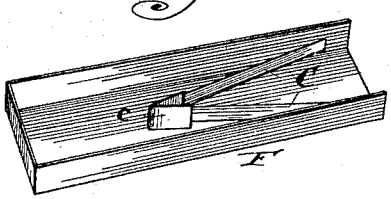
Witnesses.
Inventor,
Rufus Porter
By Offield, Towle & Linthicum
Att'ys

UNITED STATES PATENT OFFICE.

RUFUS PORTER, OF LEWISTOWN, ILLINOIS.

BEE-ESCAPE.

SPECIFICATION forming part of Letters Patent No. 489,754, dated January 10, 1893.

Application filed August 22, 1891. Serial No. 403,399. (No model.)

*To all whom it may concern:*

Be it known that I, RUFUS PORTER, a citizen of the United States, residing at Lewistown, Illinois, have invented certain new and useful Improvements in Bee-Escapes, of which the following is a specification.

The objects of my invention are, first, to provide a device by the use of which supers of honey combs or surplus honey may be freed from bees rapidly and with least expenditure of time and labor; second, to provide an escape which will not become clogged with dead bees; third to provide an escape which shall not be liable to become inoperative or clogged from deposits made by the bees upon the movable parts; fourth, to provide a bee escape in which the movable parts, (preferably spring guard pieces) may be readily adjusted to position both in the process of construction and, if necessary, in use; fifth, to construct a bee escape in which spring guard pieces are used in such manner that the guard pieces may be secured to a suitable support by dipping in melted solder and the support afterward affixed by soldering without the liability of loosening the guard pieces. To attain the first and second objects I provide a bee escape having a short and direct passage way in which are secured elastic guard pieces which will permit the bees going in at the entrance of the device to pass through and out but which will prevent their return. The short and direct passage way permits the ready escape of the bees to the brood chamber of the hive and the passage way and guard pieces are of such construction that the passing bees push or carry out as they go all dead bees that may by chance fall in the passage; and I preferably employ as an additional precaution guard pieces which move laterally, thus adapting them to work in a comparatively shallow passage way, and beneath the entrance to the passage way I provide at a lower level a chamber for the accumulation of dead bees. The third object of my invention I attain by providing a bee escape of such construction that the guard pieces or working parts of the device are out of contact with all other parts to which the bees have access, it being a well known characteristic of bees to propolize all points of contact or crevices. The fourth object I attain by attaching the spring guard pieces of the device to flexible non-elastic portions of the passage way or to similar parts attached thereto, by the bending of which the proper adjustment of the guard pieces may be easily secured. The fifth object I attain by constructing the passage ways in separate parts, and the latter joined to a complementary part making up the complete passage. The guard pieces may be thus soldered to their supports by dipping them and then the support may be secured in place by soldering without the guard pieces becoming loosened in the final soldering.

Bee escapes as sometimes constructed have long, circuitous and labyrinthian passage ways or exits comparatively easily traversed by the bees when passing from the super to the brood chamber but comparatively difficult for them to pass through when attempting to return to the super, being likely to entangle them in the labyrinth and return them to the brood chamber. This construction necessitates a large and cumbersome device, frequently not effective in preventing return, the passage ways or exits being always open, and through which on account of their extreme length the bees are often very reluctant to go when confined in the super by the escape board. Such escapes because of their winding and wedge shaped passage ways or exits are liable to become clogged with dead bees, which if not discovered soon, may occasion much loss from the smothering of the bees remaining in the super.

My improved escape obviates the objectionable features attendant upon the use of such devices.

In the accompanying drawings. Figure 1 is a perspective view, partly broken away, showing the preferred form of construction. Fig. 1ª is a similar view of the guard pieces and their support. Fig. 2 is a plan view thereof, and showing part of an escape board. Fig. 3 is a longitudinal sectional view on the line 3—3, and Fig. 4 is a transverse sectional view on the line 4—4 of Figs. 2 and 3. Fig. 5 shows a modified form of the invention wherein the spring guard pieces are fixed to the upper wall of the passage way. The free ends projecting near to its bottom. Fig. 6 is a longitudinal sectional view on the line 6—6, and Fig. 7 is a transverse sectional view on the line 7—7. Fig. 8 shows a somewhat similar construction, except that a plurality of passage ways are provided each having spring guard pieces. Fig. 9 is a longitudinal sectional view on the line 9—9. Fig. 10 is a transverse sectional view on the line 10—10. Fig. 11 shows still another form of construction in which the spring guard pieces are laterally separable, their ends being secured directly to the walls of the passage ways, and Figs. 12 and 13 are respectively longitudinal and transverse sectional elevations of the same. Figs. 14, 15 and 16 are perspective views showing modified forms in which the guard pieces are attached to flexible non-elastic pieces of sheet metal and these are in turn secured to the walls of the passage and by bending which flexible portions the guard pieces may be adjusted.

In the accompanying drawings A represents an escape board which in use is interposed between the super or upper part of the hive wherein the honey is stored and the brood chamber or lower portion of the hive. The central portion of this board is cut away and within the aperture is the escape fixed. The parts of the said escape are preferably constructed from sheet metal and comprise a supporting plate B having an aperture $b$ therein through which the bees may pass. This communicates with a short, direct passage way, closed at its end behind the aperture and open at its opposite end to the brood chamber below. This passage way may be variously formed and it may be divided into a plurality of passage ways, but I prefer to make it short and direct in all cases. I secure in the passage at some convenient point guard pieces which will yield to the passage of the bees from the super to the brood chamber, but which will prevent their passage in the opposite direction.

In the preferred form of construction which is illustrated in Figs. 1 to 4 inclusive, the guard pieces C, C are made from any suitable spring metal which should be sufficiently light so that they will yield to very slight pressure. Their ends are secured to upright metal pieces D, D which are made integral with a flat bottom piece E having one end thereof bent down or inclined, the extensions $d$ of the side pieces D projecting beyond the angle of the bottom piece.

In affixing the guard pieces, they are preferably held with their extremities in contact and their opposing ends are then soldered respectively to their supports D by dipping them in solder. The guard pieces are then adjusted so as to leave their extensions slightly separated. The upper edges of the walls D are then soldered to the under side of the top plate B and then the open ended box or tray F is soldered to the top plate so as to inclose the aperture and passage way, as clearly seen in Fig. 1 of the drawings. The space between the supports D and the vertical sides of the box F prevent the melting off of the guard pieces when soldering the box in place and at the same time give room for the lateral adjustment of the guard pieces by bending their supports laterally when it becomes necessary in use. The inclined portion of the bottom plate E of the passage way forms a ready means of access to the passage, and in connection with the box F provides a chamber G at a lower level than the bottom of the passage way within which any dead bees may accumulate, and which might otherwise clog the escape.

In the form of construction shown in Figs. 5, 6 and 7, the guard pieces are affixed to a U shaped support H, the ends of whose side walls are flared outwardly and secured to the vertical sides of the box F, thus leaving the projection $h$ free to be bent so as to adjust the extremities of the guard pieces to narrow or widen the passage below their lower ends.

In the form of construction shown in Figs. 8, 9 and 10, two passage ways are provided each having a single guard piece therein, the construction being similar to that last described and shown in Figs. 5, 6 and 7, so far as relates to the securing of the guard pieces and the arranging of the parts.

In the form of construction shown in Figs. 11, 12, and 13 the guard pieces are secured directly to the side walls of the escape, but they are likely to be melted off in affixing the escape to the top plate.

Figs. 14, 15 and 16 show respectively the bodies of the escapes with the guard pieces C, attached to flexible non-elastic pieces of sheet metal $c$ and they in turn are fastened to the walls of the bodies of the escapes. By the bending of these pieces $c$ the proper adjustment of the guard pieces can be secured.

I claim:—

1. A bee escape comprising in combination a body having an opening in its top to register with an opening in the escape board whereby it is adapted to communicate with the super and open it at its end to adapt it to communicate with the brood chamber, said body providing a passage way between the super and brood chamber, and a guard of spring metal arranged in said passage way with the movable portion thereof normally out of contact with the top and bottom of the passage way, and adapted to yield laterally to the pressure exerted thereon by the escaping bees and by its resiliency to close the passage against their return, substantially as described.

2. A bee escape comprising in combination a body having a passage whose ends open outside the body and a spring guard piece arranged in said passage and having one end thereof secured to a flexible, inelastic part of the structure and its opposite end free, whereby by bending said flexible part the free end will be adjusted to vary the size of the passage, substantially as described.

3. A bee escape comprising in combination a body having an opening in its top to register with an opening in the escape board whereby it is adapted to communicate with the super, and open at its end to adapt it to communicate with the brood chamber, said body providing a passage way between the super and brood chamber, and said passage having placed therein a laterally yielding resilient guard piece, the movable portion whereof is normally out of contact with all fixed parts of the structure whereby clogging of the guard piece with deposits made by the bees is avoided, substantially as described.

4. A bee escape having a passage way adapted to communicate at one end with the super and at the other with the brood chamber, a spring guard piece arranged in said passage way and a chamber underneath the entrance to said passage way and at a lower level than the floor of the passage whereby clogging of the passage way with dead bees is avoided, substantially as described.

5. A bee escape comprising in combination a passage way adapted to communicate at one end with the super and at the other end with the brood chamber, and a guard of spring metal arranged in said passage way and having one end thereof secured to a flexible, inelastic part of the structure and its opposite end free, whereby by bending said flexible part the free end may be adjusted to vary the size of the passage, substantially as described.

6. A bee escape comprising in combination a supporting plate having an aperture therein, a shallow open ended metallic body secured to the under side of said supporting plate and forming a passage way, spring guard pieces arranged therein, and an outer box-like body having one open end and secured to the supporting plate around the body containing the guard pieces and closing one end of said passage way, substantially as described.

RUFUS PORTER.

Witnesses:
MOSES TURNER,
GEO. K. LINTON.